Patented June 3, 1947

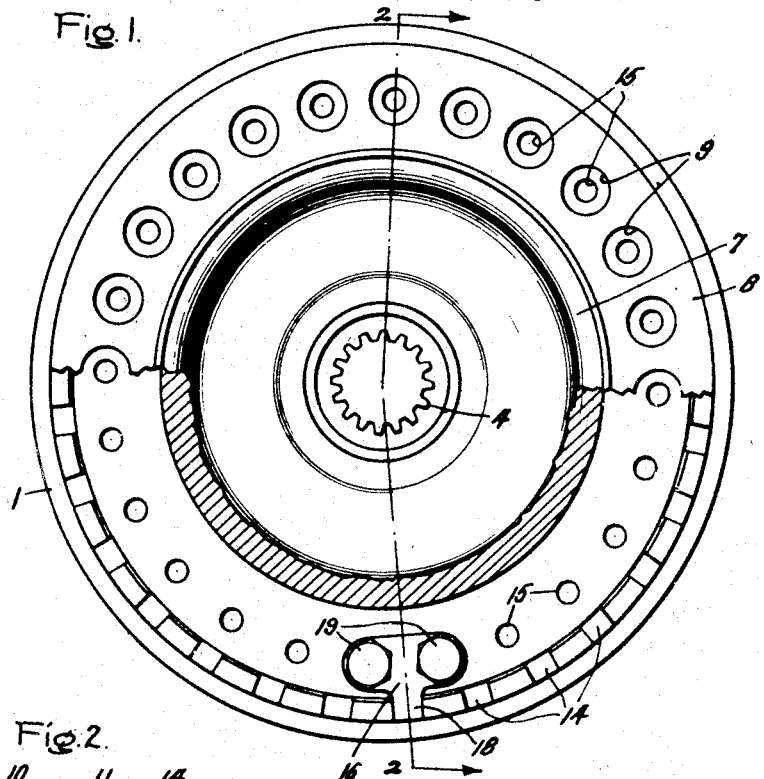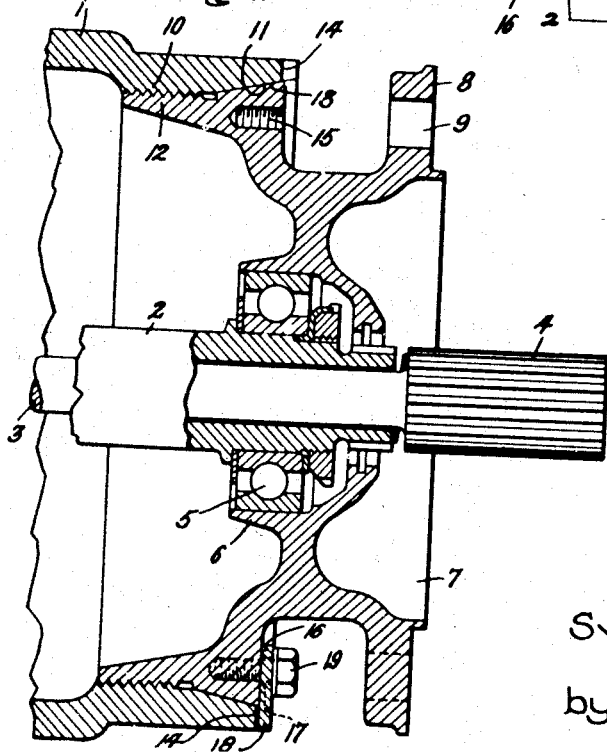

2,421,592

UNITED STATES PATENT OFFICE 2,421,592

DYNAMOELECTRIC MACHINE

Sven R. Bergman, Nahant, Mass., assignor to General Electric Company, a corporation of New York Application November 16, 1944, Serial No. 563,678

1 Claim. (Cl. 171—252)

My invention relates to dynamoelectric machines and particularly to an improved mounting flange construction for the end of such machines for supporting the machine.

An object of my invention is to provide an improved dynamoelectric machine end flange support.

Another object of my invention is to provide an improved dynamoelectric machine having an improved stationary member with a mounting flange secured directly to the end of the stationary member frame of the machine.

Further objects and advantages of my invention will become apparent and my invention will be better understood from the following description referring to the accompanying drawing, and the features of novelty which characterize my invention will be pointed out with particularity in the claim annexed to and forming part of this specification.

In the drawing, Fig. 1 is an end elevational view, partly broken away, of a dynamoelectric machine provided with an embodiment of my improved stationary member and mounting flange construction; Fig. 2 is a sectional view, line 2—2, of the end of a dynamoelectric machine provided with my improved stationary member frame and mounting flange.

Referring to the drawing, I have shown a dynamoelectric machine having a stationary member provided with a frame 1 and a rotatable member mounted on a quill shaft 2, secured at one end to a torsion rod 3, which is adapted to be driven through a spline 4. The rotatable member of the machine is mounted in suitable bearings, one of which 5 is supported in a bearing housing 6 formed in a mounting flange 7 for the machine. This mounting flange 7 is provided with an outwardly extending flange portion 8 through which a plurality of openings 9 are formed for the reception of suitable securing devices, such as studs, bolts, or screws, for securing the machine to a supporting member, such as the block of an engine or to a gear casing. In certain types of dynamoelectric machines, it is necessary to provide a very rigid mounting flange construction for supporting the stationary member of the machine in order to prevent breakage and loosening of the mounting flange which might result in misalignment of the spline 4 and twisting or breaking of the torque rod 3 or the shaft 2, with resultant damage to the rotatable and stationary members of the machine. In order to assure against such damage, I have constructed an improved stationary member and mounting flange in which the stationary member is formed with an internally threaded portion 10 adjacent one end thereof and is also provided with a frusto-conical surface 11, which, in the illustrated embodiment, is flared outwardly at the end of the frame and extends from the threaded portion to the adjacent end of the frame. The mounting flange is formed with a complementary threaded end portion 12 which is adapted to threadedly engage the threaded frame portion 10 and is formed with a frusto-conical surface 13 adjacent the threaded portion 12 which is complementary to the frame frusto-conical surface 11 and which is adapted to be drawn into tight engagement therewith by screwing the mounting flange 7 into the stationary member frame 1. This provides a very rigid and snug construction between the stationary member and the mounting flange 7. However, under certain conditions, vibration may be transmitted to this mounting flange through its supporting member or through the rotatable member to the bearings in the mounting flange which may produce excessive vibration and cause the loosening of the joint between the stationary member frame 1 and the mounting flange 7. In order to assure against such loosening of this connection, I provide a locking construction which includes a plurality of keyways 14 which are evenly circumferentially spaced apart and formed in the end edge of the stationary member frame 1 adjacent the frusto-conical surface 11. The mounting flange 7 is formed with a plurality of evenly circumferentially spaced apart threaded openings 15 adjacent the outer circumference thereof which are different in number from the number of frame keyways 14. In the illustrated arrangement, twenty-nine keyways 14 are provided, and twenty-four threaded screw hole openings 15 are formed in the mounting flange 7. The mounting flange is adapted to be locked to the frame by a key 16 which is formed with a pair of openings therein spaced apart the same distance as the spacing of the threaded openings 15 in the mounting flange, and this key is provided with a projection 18 thereon which is adapted to fit into the keyways 14. As is more clearly shown in Fig. 1 when the mounting flange 7 is drawn up tightly into the end of the stationary member frame 1, the key 16 can be arranged with the openings 17 therein over two of the threaded holes 15 with the projection 18 fitted into one of the keyways 14. When the key is in this position, it is secured by a pair of screws 19 arranged in the holes 17 in the key 16 and threadedly engaged in the flange openings, thereby locking the mounting flange 7 in position in the end of the machine frame 1. With this construction, mounting flanges 7 can readily be replaced and substituted for other mounting flanges and be drawn up into a snug rigid engagement with the end of the stationary member of the machine and locked in whatever position this may provide, as the unequal number of openings 15 in the mounting flange in relation to the keyways 14 in the stationary member frame provides a very large number of combinations in which it is possible to find two of the openings 15 in correspondence with one of the keyways 14, such that the locking key 16 can properly be secured in position for preventing relative movement between the mounting flange 7 and the stationary member frame 1.

While I have illustrated and described a particular embodiment of my invention, modifications thereof will occur to those skilled in the art. I desire it to be understood, therefore, that my invention is not to be limited to the particular arrangement disclosed, and I intend in the appended claim to cover all modifications which do not depart from the spirit and scope of my invention.

What I claim as new and desire to secure by Letters Patent of the United States is:

A dynamoelectric machine having a stationary member with a frame and a rotatable member mounted on a shaft, means including a mounting flange for said machine provided with a bearing for supporting an end of said shaft and having an outwardly extending flange portion for securing said machine stationary member to a supporting member, said stationary member frame being formed with an internally threaded portion adjacent one end thereof and a frusto-conical surface flared outwardly at the end of said frame extending from said threaded portion to the adjacent end of said frame, the outer edge of said end of said frame being formed with a plurality of evenly spaced keyways, said mounting flange being formed with a threaded end portion complementary to said frame threaded portion and with a frusto-conical surface adjacent said threaded portion complementary to said frame frusto-conical surface, means including a plurality of evenly circumferentially spaced apart threaded openings in said mounting flange different in number from said frame keyways, and a locking key having a pair of openings therein spaced apart the same distance as said threaded openings and having a projection thereon adapted to fit into said keyways, said mounting flange being adapted to be screwed into said threaded frame and to provide a tight engagement between said frusto-conical surfaces and locked in position by said key arranged with the holes therein over a pair of said mounting flange threaded openings with the projection thereon in one of said keyways, and means including a pair of screws arranged in said holes in said key and threadedly engaged in a pair of said flange openings for securing said key in position.

SVEN R. BERGMAN.

REFERENCES CITED

The following references are of record in the file of this patent:

UNITED STATES PATENTS

| Number | Name | Date |
|---|---|---|
| 1,880,124 | Elwert | Sept. 27, 1932 |
| 631,445 | Smith | Aug. 22, 1889 |
| 1,229,693 | Wilson | June 12, 1917 |
| 1,306,018 | Moses | June 10, 1919 |
| 1,401,548 | Murphy | Dec. 27, 1921 |
| 1,350,077 | Loudon | Aug. 17, 1920 |
| 2,037,083 | McCormick | Apr. 14, 1936 |

FOREIGN PATENTS

| Number | Country | Date |
|---|---|---|
| 25,641 | France | Apr. 21, 1923 |